US012623528B2

(12) United States Patent
Zhang et al.

(10) Patent No.: US 12,623,528 B2
(45) Date of Patent: May 12, 2026

(54) CLUTCH ASSEMBLY, POWER MECHANISM AND VEHICLE

(71) Applicant: BYD COMPANY LIMITED, Shenzhen (CN)

(72) Inventors: Feng Zhang, Shenzhen (CN); Gaoming Zhao, Shenzhen (CN); Yinsheng Liao, Shenzhen (CN); Ning Zhu, Shenzhen (CN); Qiang Wang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 18/939,164

(22) Filed: Nov. 6, 2024

(65) Prior Publication Data

US 2025/0058620 A1 Feb. 20, 2025

Related U.S. Application Data

(63) Continuation of application No. PCT/CN2023/097354, filed on May 31, 2023.

(30) Foreign Application Priority Data

May 31, 2022 (CN) .......................... 202210613299.2

(51) Int. Cl.
$B60K\ 6/387$ (2007.10)
(52) U.S. Cl.
CPC .................................... $B60K\ 6/387$ (2013.01)
(58) Field of Classification Search
CPC . B60K 6/387; B60K 6/44; B60K 1/02; B60K 6/442; B60K 6/365; B60K 6/383; F16H 3/091–3/093
See application file for complete search history.

(56) References Cited

U.S. PATENT DOCUMENTS

| | | | | |
|---|---|---|---|---|
| 4,411,171 A | 10/1983 | Fiala | | |
| 10,836,375 B2 * | 11/2020 | Kaufman | .............. | B60W 20/13 |

(Continued)

FOREIGN PATENT DOCUMENTS

| | | |
|---|---|---|
| CN | 101607523 A | 12/2009 |
| CN | 102039808 A | 5/2011 |

(Continued)

OTHER PUBLICATIONS

International Search Report and Written Opinion for Application No. PCT/CN2023/097354, mailed on Sep. 12, 2023, 12 pages.

(Continued)

*Primary Examiner* — Stacey A Fluhart
(74) *Attorney, Agent, or Firm* — Sheppard Mullin Richter & Hampton LLP

(57) ABSTRACT

A clutch assembly includes a first transmission member, a first clutch component, and a second clutch component. The first clutch component includes a first clutch portion and a second clutch portion, and the second clutch component includes a third clutch portion and a fourth clutch portion. The first clutch portion and the third clutch portion are connected to the first transmission member to enable the first transmission member to form a first end of the clutch assembly. The second clutch portion is selectively engaged with the first clutch portion to enable the second clutch portion to form a second end of the clutch assembly. The fourth clutch portion is selectively engaged with the third clutch portion to enable the fourth clutch portion to form a third end of the clutch assembly.

17 Claims, 3 Drawing Sheets

(56) References Cited

U.S. PATENT DOCUMENTS

| | | | |
|---|---|---|---|
| 2007/0175723 A1 | 8/2007 | Blessing et al. | |
| 2013/0090208 A1* | 4/2013 | Ichikawa | B60W 20/40 |
| | | | 477/6 |
| 2013/0153356 A1 | 6/2013 | Fleischmann et al. | |
| 2021/0016647 A1* | 1/2021 | Houser | F16H 63/304 |
| 2021/0107347 A1* | 4/2021 | Yano | B60K 6/442 |
| 2021/0162854 A1 | 6/2021 | Lehmann et al. | |
| 2021/0178889 A1* | 6/2021 | Singh | B60K 6/445 |
| 2023/0228328 A1* | 7/2023 | Yildir | F16D 23/025 |
| | | | 74/339 |
| 2023/0398832 A1* | 12/2023 | Liu | B60K 1/00 |

FOREIGN PATENT DOCUMENTS

| | | | | | |
|---|---|---|---|---|---|
| CN | 102381177 | A | | 3/2012 | |
| CN | 207842651 | U | | 9/2018 | |
| CN | 208734758 | U | | 4/2019 | |
| CN | 110667368 | A | | 1/2020 | |
| CN | 110892167 | A | | 3/2020 | |
| CN | 111016619 | A | * | 4/2020 | B60K 6/38 |
| CN | 111055672 | A | | 4/2020 | |
| CN | 111114275 | A | * | 5/2020 | |
| CN | 111319607 | A | | 6/2020 | |
| CN | 111347869 | A | | 6/2020 | |
| CN | 112108234 | A | | 12/2020 | |
| CN | 112319204 | A | | 2/2021 | |
| CN | 112572127 | A | | 3/2021 | |
| CN | 108544916 | B | | 7/2021 | |
| CN | 215596239 | U | | 1/2022 | |
| CN | 216709004 | U | | 6/2022 | |
| CN | 217381366 | U | | 9/2022 | |
| CN | 217994129 | U | | 12/2022 | |
| CN | 218228631 | U | | 1/2023 | |
| CN | 219424610 | U | | 7/2023 | |
| EP | 4534311 | A1 | | 4/2025 | |
| JP | 2003-220841 | A | | 8/2003 | |
| JP | 5318185 | B2 | | 10/2013 | |
| JP | 2018-185028 | A | | 11/2018 | |
| JP | 2020-029938 | A | | 2/2020 | |
| JP | 2020-039234 | A | | 3/2020 | |
| JP | 2020-165474 | A | | 10/2020 | |
| KR | 101786338 | B1 | | 10/2017 | |
| KR | 20180095234 | A | | 8/2018 | |
| WO | 2018/078921 | A1 | | 5/2018 | |
| WO | 2021/239693 | A1 | | 12/2021 | |

OTHER PUBLICATIONS

Extended European Search Report dated Jan. 14, 2025, issued in European Patent Application No. 22900537.6 (6 pages).

Extended European Search Report dated May 22, 2025, issued in European Patent Application No. 23815240.9 (7 pages).

Extended European Search Report dated Jul. 23, 2025, issued in European Patent Application No. 23815239.1 (8 pages).

Notice of Reasons for Refusal dated Jul. 15, 2025, issued in Japanese Patent Application No. 2024-512972, with English machine translation (13 pages).

Non-Final Office Action dated Jul. 29, 2025, issued in U.S. Appl. No. 18/606,233 (7 pages).

* cited by examiner

CLUTCH ASSEMBLY, POWER MECHANISM AND VEHICLE

CROSS-REFERENCE TO RELATED APPLICATIONS

This application is a continuation application of International Patent Application No. PCT/CN2023/097354, filed on May 31, 2023, which is based on and claims priority to and benefits of Chinese Patent Application No. 202210613299.2 filed on May 31, 2022. The entire content of all of the above-referenced applications is incorporated herein by reference.

FIELD

The present disclosure relates to the field of vehicles, and particularly, to a clutch assembly, a power mechanism, and a vehicle.

BACKGROUND

As the demand for energy saving and environmental protection becomes higher, new energy vehicles have gradually become mainstream models for consumers to select. Types of existing new energy vehicles mainly include pure electric vehicles and hybrid vehicles. To alleviate concerns about service life of batteries, demands of consumers for hybrid vehicles gradually increase. However, in consideration of an engine and a motor, an existing hybrid vehicle has a complex transmission system and a long transmission chain. As a result, the transmission system occupies a large space.

SUMMARY

The technical problem resolved by the present disclosure is that an existing transmission system is complex in structure and occupies a large space.

To resolve the foregoing technical problem, examples of the present disclosure provide a clutch assembly. The clutch assembly includes a first transmission member, a first clutch component, and a second clutch component. The first clutch component includes a first clutch portion and a second clutch portion. The second clutch component includes a third clutch portion and a fourth clutch portion. The first clutch portion and the third clutch portion are connected to the first transmission member to enable the first transmission member to form a first end of the clutch assembly. The first clutch portion is selectively engaged with the second clutch portion to enable the second clutch portion to form a second end of the clutch assembly. The fourth clutch portion is selectively engaged with the third clutch portion to enable the fourth clutch portion to form a third end of the clutch assembly.

In an embodiment, the first end is an output end of the clutch assembly, and the second end and the third end are input ends of the clutch assembly.

In an embodiment, the second end is an output end of the clutch assembly, and the first end and the third end are input ends of the clutch assembly.

In an embodiment, along a thickness direction of the first transmission member, the first clutch portion and the third clutch portion are respectively connected to two sides of the first transmission member. Along the thickness direction of the first transmission member, a projection of the first clutch portion and a projection of the third clutch portion at least partially overlap.

In an embodiment, the first transmission member is a gear. The first clutch portion and the third clutch portion are connected to each other to form a clutch body, and the first transmission member is disposed on the clutch body.

In an embodiment, an outer periphery of the clutch body includes teeth as the first transmission member.

In an embodiment, the first transmission member, the first clutch portion, and the third clutch portion are integrally formed.

In an embodiment, the clutch assembly further includes a countershaft. The first transmission member is connected to the countershaft. The second clutch portion and the fourth clutch portion are rotatably disposed on the countershaft.

In an embodiment, the countershaft has a free end and a limiting end. A direction from the second clutch portion to the fourth clutch portion is the same as a direction from the free end to the limiting end.

In an embodiment, a first limiting portion is formed on the fourth clutch portion. A second limiting portion is disposed on the limiting end of the countershaft. The first limiting portion is coupled with the second limiting portion to limit axial movement of the countershaft.

In an embodiment, the fourth clutch portion is recessed toward a side away from the limiting end to form the first limiting portion. The limiting end protrudes toward a side away from the free end to form the second limiting portion. The first limiting portion is a spherical groove. The second limiting portion is a spherical protrusion. The first limiting portion and the second limiting portion are concentric and spaced apart.

In an embodiment, the clutch assembly further includes a housing, a first bearing, and a second bearing. The first bearing is fixed between the fourth clutch portion and the countershaft to enable the fourth clutch portion and the countershaft to relatively rotate. The second bearing is fixed between the fourth clutch portion and the housing to enable the fourth clutch portion and the housing to relatively rotate. Along a radial direction of the countershaft, a projection of the first bearing and a projection of the second bearing at least partially overlap.

The present disclosure provides a clutch assembly. The clutch assembly can selectively output at least one of two powers, that is, the clutch assembly can complete functions of two clutches. A first clutch portion and a third clutch portion are fixed on a first transmission member, so that integration of two clutch components is implemented. Compared with two clutches, the clutch assembly can achieve an effect of the two clutches, and also make the entire clutch assembly more compact, so that the volume and the occupied space are significantly reduced. In addition, the first transmission member implements power transmission, and is also used as a mounting carrier for a first clutch component and a second clutch component. In this way, parts of the clutch assembly are reduced, integration of the entire clutch assembly is improved, and costs are reduced to a certain extent.

The present disclosure further provides a power mechanism. The power mechanism includes a first power member, a second power member, and the foregoing clutch assembly. Two of the first end, the second end, and the third end are input ends, and the other of the first end, the second end, and the third end is an output end. The first power member and the second power member are connected to the input ends. The output end is connected to a first driving end.

In an embodiment, the power mechanism further includes a third power member. The third power member is configured to output power to a second driving end.

The present disclosure further provides a vehicle. The vehicle includes the foregoing power mechanism.

100: clutch assembly;

10: countershaft; 101: second limiting portion;

20: first transmission member;

30: first clutch component; 301: first clutch portion; 302: second clutch portion;

40: second clutch component; 401: third clutch portion; 4011: cavity; 4012: first limiting portion; 402: fourth clutch portion;

50: first bearing;

60: second bearing;

70: third bearing;

80: fourth bearing;

200: first power member;

300: second power member;

400: third power member;

500: front wheel;

600: rear wheel;

700: power battery;

1000: power mechanism; and

2000: vehicle.

DETAILED DESCRIPTION

To make the problems, solutions, and beneficial effects resolved by the present disclosure clearer and more understandable, the present disclosure is described in further detail with references to examples below. It should be understood that the examples described herein are only for explaining the present disclosure but are not to limit the present disclosure.

Figures 1, 2:
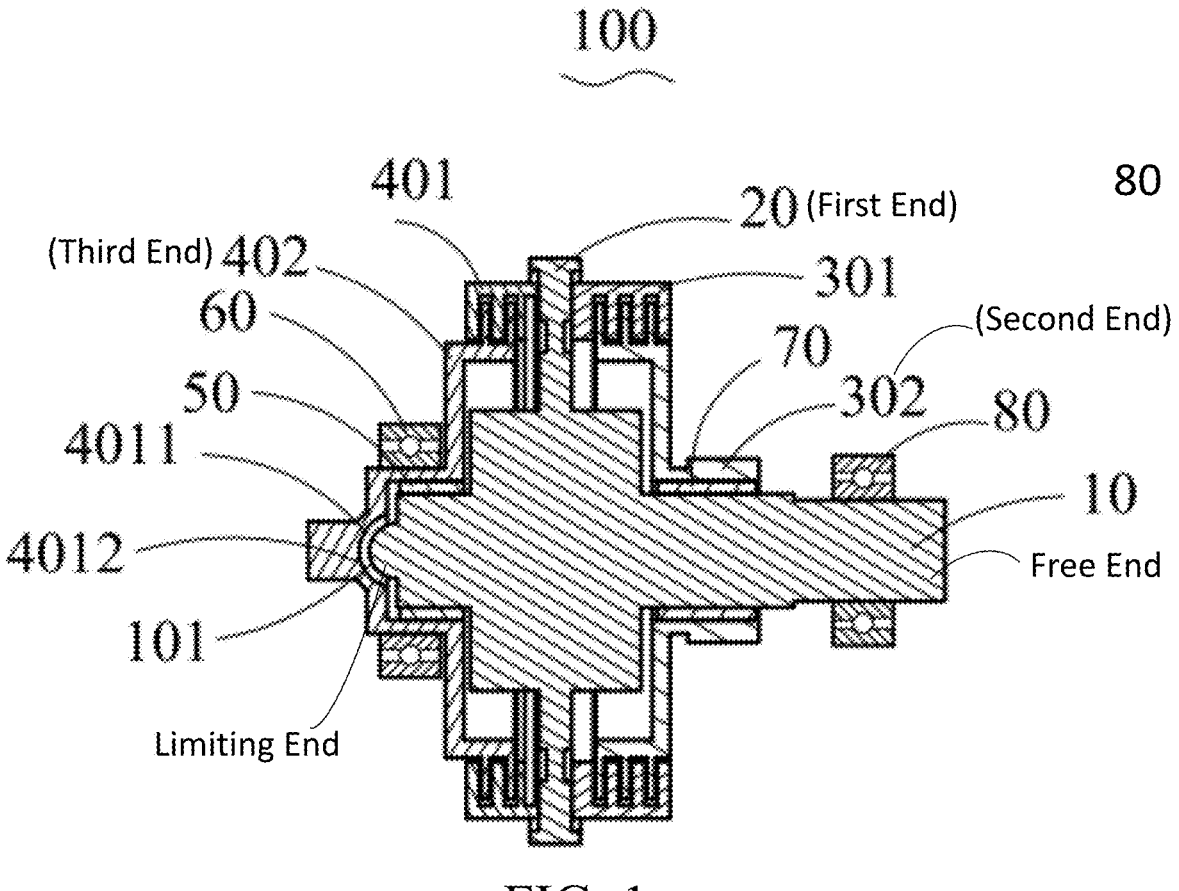
FIG. 1 is a cross-sectional view of a clutch assembly according to an example of the present disclosure.
FIG. 2 is a schematic diagram of a power mechanism according to an example of the present disclosure.

As shown in FIG. 1, an example of the present disclosure provides a clutch assembly 100. The clutch assembly 100 includes a first transmission member 20, a first clutch component 30, and a second clutch component 40. The first clutch component 30 includes a first clutch portion 301 and a second clutch portion 302. The second clutch component 40 includes a third clutch portion 401 and a fourth clutch portion 402. The first clutch portion 301 and the third clutch portion 401 are connected to the first transmission member 20 to enable the first transmission member 20 to form a first end of the clutch assembly. The first clutch portion 301 is selectively engaged with the second clutch portion 302 to enable the second clutch portion 302 to form a second end of the clutch assembly. The third clutch portion 401 is selectively engaged with the fourth clutch portion 402 to enable the fourth clutch portion 402 to form a third end of the clutch assembly. Two of the first end, the second end, and the third end of the clutch assembly 100 are input ends, and the other of the first end, the second end, and the third end is an output end.

The clutch assembly 100 can selectively output at least one of two powers, that is, the clutch assembly 100 can complete functions of two clutches. A first clutch portion 301 and a third clutch portion 401 are fixed on a first transmission member 20, so that integration of two clutch components is implemented. Compared with two clutches, the clutch assembly 100 can achieve an effect of the two clutches, and also make the entire clutch assembly 100 more compact, so that the volume and the occupied space are significantly reduced. In addition, the first transmission member 20 implements power transmission, and is also used as a mounting carrier for a first clutch component 30 and a second clutch component 40. In this way, parts of the clutch assembly 100 are reduced, integration of the entire clutch assembly 100 is improved, and costs are reduced to a certain extent.

In an example not shown in the figure, the first end is an output end, and the second end and the third end are input ends. In this way, a power source connected to the second clutch portion 302 and a power source connected to the fourth clutch portion 402 can selectively output power through the first transmission member 20 in the clutch assembly 100.

In this example, the power source connected to the second clutch portion 302 and the power source connected to the fourth clutch portion 402 may be the same or different.

In the example shown in FIG. 1, the second end is an output end, and the first end and the third end are input ends. In this way, a power source connected to the fourth clutch portion 402 and a power source connected to the first transmission member 20 selectively output power through the second clutch portion 302 in the clutch assembly 100. In this example, the power source connected to the fourth clutch portion 402 and the power source connected to the first transmission member 20 may be the same or different.

It should be understood that when the first clutch portion 301 is engaged with the third clutch portion 401 and the second clutch portion 302 is disengaged from the fourth clutch portion 402, power output of a single power source is implemented. When the first clutch portion 301 is engaged with the third clutch portion 401 and the second clutch portion 302 is engaged with the fourth clutch portion 402, output of a single power source can be implemented, and joint output of two power sources can also be implemented.

As shown in FIG. 1, along a thickness direction of the first transmission member 20, the first clutch portion 301 and the third clutch portion 401 are respectively connected to two sides of the first transmission member 20. Along the thickness direction of the first transmission member 20, a projection of the first clutch portion 301 and a projection of the third clutch portion 401 at least partially overlap. In an embodiment, the first clutch portion 301 and the third clutch portion 401 are arranged/disposed side by side on the two sides of the first transmission member 20 along the thickness direction of the first transmission member 20. This implements integration of the first clutch component 30 and the second clutch component 40, and also reduces sizes of the first clutch portion 301 and the third clutch portion 401 along a radial direction, thereby effectively reducing a volume of the clutch assembly 100.

In the examples as shown in FIG. 1 and FIG. 2, the first transmission member 20 is a gear, and the first clutch portion 301 and the third clutch portion 401 are fixedly connected to an inner side of the gear, that is, connected to the inner side on which teeth are formed.

In an example, the first clutch portion 301 the third clutch portion 401 may be fixedly connected to form a clutch body. The first transmission member 20 is arranged on the clutch body.

In an example, an outer periphery of the clutch body may be constructed with teeth to form the first transmission member 20 (gear). In this way, the space occupied by the first clutch portion 301, the third clutch portion 401, and the first transmission member 20 can be further reduced, thereby reducing the volume of the clutch assembly 100.

In another example, the first transmission member 20 may also be a partial element in a planetary row, and the like, as long as it can be used for power transmission.

In some examples, the first clutch portion 301, the third clutch portion 401, and the first transmission member 20 are integrally formed. The first clutch portion 301, the third clutch portion 401, and the first transmission member 20 that are integrally formed further reduce an axial size, thereby further reducing the volume.

In the examples shown in FIG. 1 and FIG. 2, the first clutch portion 301 and the third clutch portion 401 are fixedly connected to the first transmission member 20. In an embodiment, the first clutch portion 301 and the third clutch portion 401 are welded to the first transmission member 20. Certainly, the first clutch portion 301 and the third clutch portion 401 may also be fixed on the first transmission member 20 through a screw connection or the like.

As shown in FIG. 1, the clutch assembly 100 further includes a countershaft 10. The first transmission member 20 is connected to the countershaft 10. The second clutch portion 302 and the fourth clutch portion 402 are rotatably connected to the countershaft 10.

The countershaft 10 has a free end and a limiting end. A direction from the second clutch portion 302 to the fourth clutch portion 402 is the same as a direction from the free end to the limiting end. It should be understood that the free end and the limiting end in the present disclosure are respectively formed on two ends of this countershaft 10. The free end is formed on a right side of the countershaft 10 in FIG. 1. The limiting end is formed on a left side of the countershaft 10 in FIG. 1.

As shown in FIG. 1, a first limiting portion 4012 is arranged in the fourth clutch portion 402. A second limiting portion 101 is arranged on the countershaft 10. The first limiting portion 4012 cooperates with the second limiting portion 101 to limit axial movement of the countershaft 10. An end of the countershaft 10 is the free end. Therefore, the axial movement of the countershaft 10 is limited by the first limiting portion 4012 and the second limiting portion 101, thereby improving structural stability.

In an example, the first limiting portion 4012 is a spherical groove. The second limiting portion 101 is a spherical protrusion. The spherical groove and the spherical protrusion are concentrically arranged. In this way, even if the countershaft 10 undergoes axial displacement within a certain range to cause the first limiting portion 4012 to come into contact with the second limiting portion 101, the spherical groove and the spherical protrusion concentrically arranged can also enable the countershaft 10 and the fourth clutch portion 402 to relatively rotate, so that the clutch assembly 100 can normally operate.

As shown in FIG. 1, a cavity 4011 is provided in the fourth clutch portion 402, and one end of the countershaft 10 is located in the cavity 4011. The cavity 4011 is provided in the fourth clutch portion 402, so that the countershaft 10 is arranged in the cavity 4011. Then, the other end of the countershaft 10 is also mounted through mounting of the fourth clutch portion 402. This avoids increasing the axial size when arranging a mounting position on one end of the countershaft 10, thereby further reducing the axial size, and making the entire clutch assembly 100 more compact. In addition, the arrangement of the cavity 4011 also provides a condition for the arrangement of the first limiting portion 4012 below. The foregoing first limiting portion 4012 is formed in the cavity 4011.

In an example, the clutch assembly 100 further includes a housing. An inner side of the second clutch portion 302 is rotatably sleeved on the countershaft 10 through the first bearing 50, and an outer side of a driven member is rotatably connected to the housing through the second bearing 60. Along a radial direction of the countershaft 10, a projection of the first bearing 50 and a projection of the second bearing 60 at least partially overlap. In this way, a load along the radial direction of the countershaft 10 during power transmission can be transmitted to the housing through the first bearing 50, the fourth clutch portion 402, and the second bearing 60, avoiding damage to the entire system by shear force caused by completely misaligned arrangement of the first bearing 50 and the second bearing 60, thereby improving the life of the clutch assembly 100.

As shown in FIG. 1, the clutch assembly 100 further includes a third bearing 70 and a fourth bearing 80. The second clutch portion 302 is sleeved on the countershaft 10 through the third bearing 70, and the countershaft 10 is rotatably connected to the housing through the fourth bearing 80, to implement relative rotation between the housing and the countershaft 10.

Figure 3:
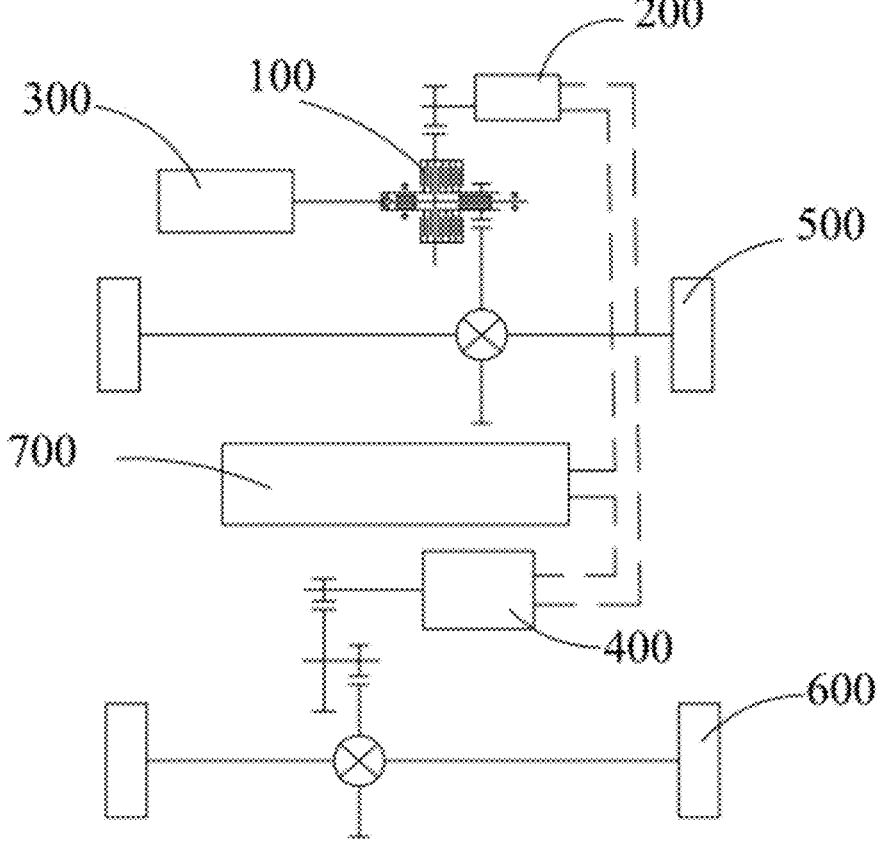
FIG. 3 is a schematic diagram of a power mechanism according to another example of the present disclosure.

As shown in FIG. 2 and FIG. 3, an example of the present disclosure further provides a power mechanism 1000. The power mechanism 1000 includes a first power member 200, a second power member 300, and the foregoing clutch assembly 100. The first power member 200 and the second power member 300 are connected to the input ends. The output end is drivingly connected to a first driving end.

One of the first power member 200 and the second power member 300 is an engine, and the other of the first power member 200 and the second power member 300 is a motor.

The first transmission member 20 is configured to connect to the first power member 200. The fourth clutch portion 402 is configured to connect to the second power member 300. The second clutch portion 302 is configured to output power to wheels. The first power member 200 is an engine, and the second power member 300 is a motor.

In the examples as shown in FIG. 1 and FIG. 2, the first power member 200 is a motor, and the second power member 300 is an engine. In this way, the engine and the motor can selectively input power to the wheels, and the engine and the motor can also be selectively engaged. In this way, the engine during operation can output power to the motor, to enable the motor to generate electricity.

In the example shown in FIG. 2, the first power member 200 is a motor, the second power member 300 is an engine, the first transmission member 20 is configured to connect to the motor, and the second clutch portion 302 is configured to output power to the wheels. In this way, the engine can be selectively engaged with the motor through the clutch assembly 100, so that the power can be selectively transmitted to the motor, to enable the motor to generate electricity. The motor selectively transmits power of the motor or the engine to the wheels through the clutch assembly 100 (when the motor is connected to the engine through a clutch).

In the clutch assembly 100, the first clutch portion 301 of the first clutch component 30 and the third clutch portion

401 of the second clutch component 40 are fixedly connected to the first transmission member 20. The first transmission member 20 implements power transmission from the first power member 200 or the second power member 300 to the wheels, and is also used as a carrier for integration of the first clutch component 30 and the second clutch component 40. In this way, integration of the two clutches and the first transmission member 20 is implemented, and the structure is compact, so that the volume and the occupied space of the clutch assembly 100 are reduced. In addition, because the volume of the clutch assembly 100 is reduced, a power transmission chain is shortened, thereby improving efficiency of power transmission.

In an example, the first transmission member 20 may be configured to output power to the wheels, and in this case, the second clutch portion 302 may be configured to connect to the first power member 200. In this way, the first clutch component 30 can selectively transmit power from the first power member 200 to the wheels, and the second clutch component 40 can selectively transmit power from the second power member 300 to the wheels. It should be understood that the first power member 200 and the second power member 300 may be engines or motors. Generally, one of the first power member 200 and the second power member 300 is a motor, and the other of the first power member 200 and the second power member 300 is an engine.

As shown in FIG. 3, the power mechanism 1000 provided in the present disclosure further includes a third power member 400. The third power member 400 is configured to output power to a second driving end. The first driving end is a front wheel 500, and the second driving end is a rear wheel 600. In this way, timely four-wheel drive can be implemented by using three power members, so that a four-wheel drive function is implemented, and cost are reduced. The clutch assembly 100 in the present disclosure is used, so that the entire power mechanism 1000 has a compact structure, occupies a small area, and is easy to arrange and mount.

In addition, the power mechanism 1000 further includes a power battery 700. When the first power member 200 and the third power member 400 are motors, the first power member 200 and the third power member 400 are connected to the power battery 700, to enable the power battery 700 to supply power to the motors. In addition, the first power member 200 is electrically connected to the third power member 400, to enable the first power member 200 to supply electrical energy to the power battery 700 or the third power member 400 in a power generation state.

Figure 4:
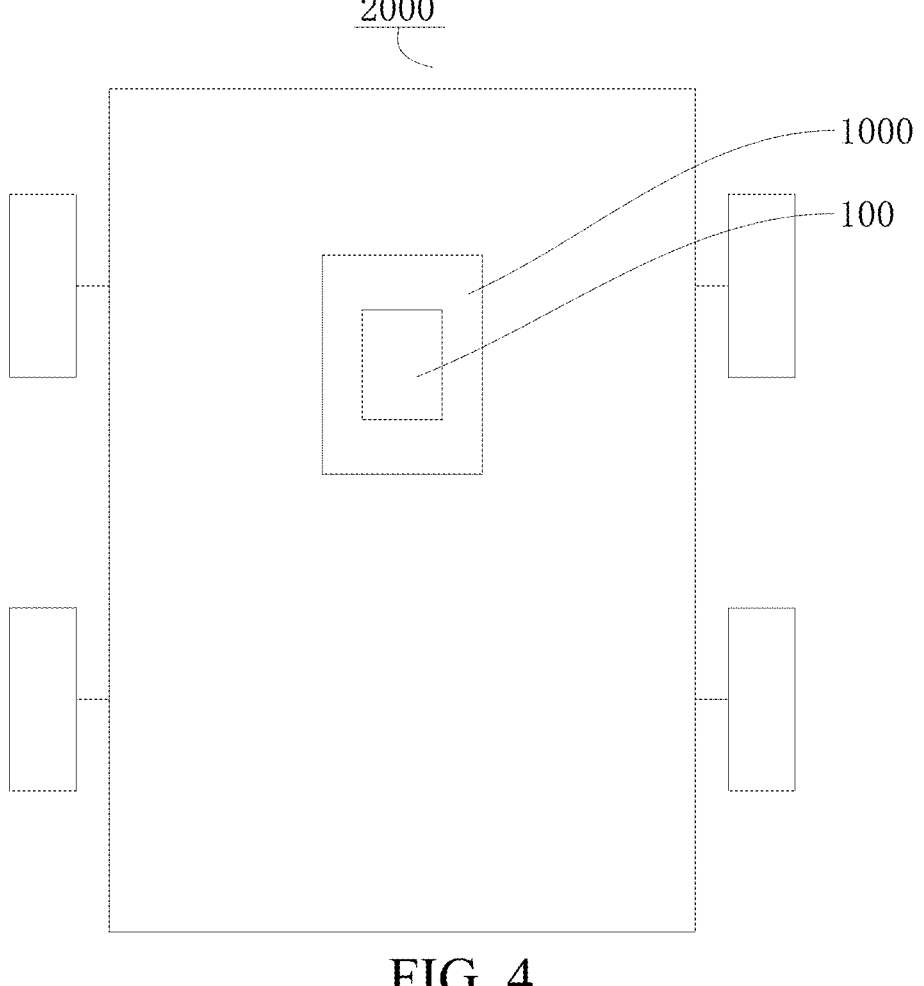
FIG. 4 is a schematic diagram of a vehicle according to an example of the present disclosure.

As shown in FIG. 4, the present disclosure further provides a vehicle 2000. The vehicle 2000 includes the foregoing power mechanism 1000.

The foregoing descriptions are merely examples of the present disclosure, but are not to limit the present disclosure. Any modification, equivalent replacement, or improvement made within the spirit and principle of the present disclosure shall fall within the protection scope of the present disclosure.

What is claimed is:

1. A clutch assembly, comprising a countershaft, a first transmission member, a first clutch component, and a second clutch component, the first clutch component comprising a first clutch portion and a second clutch portion, the second clutch component comprising a third clutch portion and a fourth clutch portion, the first clutch portion and the third clutch portion being connected to the first transmission member to enable the first transmission member to form a first end of the clutch assembly, the second clutch portion being selectively engaged with the first clutch portion to enable the second clutch portion to form a second end of the clutch assembly, wherein the first transmission member is a gear, the first clutch portion and the third clutch portion are connected to each other to form a clutch body, and the first transmission member is disposed on the clutch body, the fourth clutch portion being selectively engaged with the third clutch portion to enable the fourth clutch portion to form a third end of the clutch assembly, and the countershaft having a free end and a limiting end, and a direction from the second clutch portion to the fourth clutch portion is the same as a direction from the free end to the limiting end.

2. The clutch assembly according to claim 1, wherein the first end is an output end of the clutch assembly, and the second end and the third end are input ends of the clutch assembly.

3. The clutch assembly according to claim 1, wherein the second end is an output end of the clutch assembly, and the first end and the third end are input ends of the clutch assembly.

4. The clutch assembly according to claim 1, wherein along a thickness direction of the first transmission member, the first clutch portion and the third clutch portion are respectively connected to two sides of the first transmission member; and along the thickness direction of the first transmission member, a projection of the first clutch portion and a projection of the third clutch portion at least partially overlap.

5. The clutch assembly according to claim 1, wherein an outer periphery of the clutch body comprises teeth as the first transmission member.

6. The clutch assembly according to claim 1, wherein the first transmission member, the first clutch portion, and the third clutch portion are integrally formed.

7. The clutch assembly according to claim 1, wherein the first transmission member is connected to the countershaft, and the second clutch portion and the fourth clutch portion are rotatably disposed on the countershaft.

8. The clutch assembly according to claim 7, further comprising a housing, a first bearing, and a second bearing, wherein:

the first bearing is connected between the fourth clutch portion and the countershaft to enable the fourth clutch portion and the countershaft to relatively rotate, the second bearing is connected between the fourth clutch portion and the housing to enable the fourth clutch portion and the housing to relatively rotate, and along a radial direction of the countershaft, a projection of the first bearing and a projection of the second bearing at least partially overlap.

9. The clutch assembly according to claim 1, wherein a first limiting portion is formed on the fourth clutch portion, a second limiting portion is disposed on the limiting end of the countershaft, and the first limiting portion is coupled with the second limiting portion to limit axial movement of the countershaft.

10. The clutch assembly according to claim 9, wherein the fourth clutch portion is recessed toward a side away from the limiting end to form the first limiting portion, the limiting end protrudes toward a side away from the free end to form the second limiting portion, the first limiting portion comprises a spherical groove, the second limiting portion comprises a spherical protrusion, and the first limiting portion and the second limiting portion are concentric and spaced apart.

11. A power mechanism, comprising a first power member, a second power member, and a clutch assembly, wherein the clutch assembly comprises a countershaft, a first transmission member, a first clutch component, and a second clutch component, the first clutch component comprising a first clutch portion and a second clutch portion, the second clutch component comprising a third clutch portion and a fourth clutch portion, the first clutch portion and the third clutch portion being connected to the first transmission member to enable the first transmission member to form a first end of the clutch assembly, the first transmission member is a gear, the first clutch portion and the third clutch portion are connected to each other to form a clutch body, the first transmission member is disposed on the clutch body, the second clutch portion being selectively engaged with the first clutch portion to enable the second clutch portion to form a second end of the clutch assembly, the fourth clutch portion being selectively engaged with the third clutch portion to enable the fourth clutch portion to form a third end of the clutch assembly, the countershaft having a free end and a limiting end, and a direction from the second clutch portion to the fourth clutch portion is the same as a direction from the free end to the limiting end; and two of the first end, the second end, and the third end are input ends of the clutch assembly, the other one of the first end, the second end, and the third end is an output end of the clutch assembly, the first power member and the second power member are connected to the input ends, and the output end is connected to a first driving end.

12. The power mechanism according to claim 11, further comprising a third power member, wherein the third power member is configured to output power to a second driving end.

13. The power mechanism according to claim 11, wherein the first end is an output end of the clutch assembly, and the second end and the third end are input ends of the clutch assembly.

14. The power mechanism according to claim 11, wherein the second end is an output end of the clutch assembly, and the first end and the third end are input ends of the clutch assembly.

15. The power mechanism according to claim 11, wherein along a thickness direction of the first transmission member, the first clutch portion and the third clutch portion are respectively connected to two sides of the first transmission member; and along the thickness direction of the first transmission member, a projection of the first clutch portion and a projection of the third clutch portion at least partially overlap.

16. The power mechanism according to claim 11, wherein an outer periphery of the clutch body comprises teeth as the first transmission member.

17. A vehicle, comprising a power mechanism, power mechanism comprising a first power member, a second power member, and a clutch assembly, wherein the clutch assembly comprises a countershaft, a first transmission member, a first clutch component, and a second clutch component, the first clutch component comprising a first clutch portion and a second clutch portion, the second clutch component comprising a third clutch portion and a fourth clutch portion, the first clutch portion and the third clutch portion being connected to the first transmission member to enable the first transmission member to form a first end of the clutch assembly, the first transmission member is a gear, the first clutch portion and the third clutch portion are connected to each other to form a clutch body, the first transmission member is disposed on the clutch body, the second clutch portion being selectively engaged with the first clutch portion to enable the second clutch portion to form a second end of the clutch assembly, the fourth clutch portion being selectively engaged with the third clutch portion to enable the fourth clutch portion to form a third end of the clutch assembly, the countershaft having a free end and a limiting end, and a direction from the second clutch portion to the fourth clutch portion is the same as a direction from the free end to the limiting end; and two of the first end, the second end, and the third end are input ends, the other one of the first end, the second end, and the third end is an output end, the first power member and the second power member are connected to the input ends, and the output end is connected to a first driving end.

\* \* \* \* \*